(12) United States Patent
Mukai et al.

(10) Patent No.: US 6,223,852 B1
(45) Date of Patent: *May 1, 2001

(54) ELECTRIC POWER STEERING APPARATUS (75) Inventors: Yoshinobu Mukai; Yoshiki Noro; Yasuo Shimizu; Osamu Tsurumiya; Takao Kurosawa; Nobuo Sugitani, all of Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,107

(22) Filed: Jul. 31, 1998

(30) Foreign Application Priority Data

Aug. 18, 1997 (JP) .................................................. 9-221797

(51) Int. Cl.[7] ..................................................... B62D 5/04
(52) U.S. Cl. ......................... 180/446; 180/443; 701/43
(58) Field of Search .................................. 180/404, 446, 180/410, 443; 701/41, 43

(56) References Cited

U.S. PATENT DOCUMENTS

| | | | |
|---|---|---|---|
| 4,753,310 | * | 6/1988 | Hashimoto . |
| 4,984,647 | * | 1/1991 | Morishita et al. ................ 701/41 |
| 5,339,243 | * | 8/1994 | Matsuoka et al. ................ 701/43 |
| 5,659,472 | * | 8/1997 | Nishino et al. ................... 701/41 |
| 5,758,741 | * | 6/1998 | Tomioka ........................... 180/446 |
| 5,788,010 | * | 8/1998 | Mukai et al. ..................... 180/446 |
| 5,881,836 | * | 3/1999 | Nishimoto et al. .............. 180/446 |
| 5,913,913 | * | 6/1999 | Okanoue et al. ................. 701/41 |
| 5,992,556 | * | 11/1999 | Miller ............................... 180/446 |

FOREIGN PATENT DOCUMENTS 7-94227   10/1995   (JP) .

* cited by examiner

Primary Examiner—J. J. Swann
Assistant Examiner—Christopher Bottorff
(74) Attorney, Agent, or Firm—Merchant & Gould P.C.

(57) ABSTRACT

An electric power steering apparatus for a vehicle includes a protection circuit for stopping operation of an electric motor provided to apply a steering assist force to a steering system of the vehicle. The protection circuit is operable to stop operation of the electric motor when an ignition off signal is supplied from an ignition sensor and at least one of an engine speed signal supplied from an engine speed sensor and a vehicle velocity signal supplied from a vehicle velocity sensor falls below a corresponding predetermined value. Even if an ignition on signal is not supplied during movement of the vehicle due to a failure in the ignition sensor, when the engine speed signal or the vehicle velocity signal is above the predetermined value, the vehicle is regarded as being in the running state and operation of the electric motor is continued to apply the steering assist force to the steering system. With this arrangement, a good and stable steering feel can be obtained during movement of the vehicle.

9 Claims, 9 Drawing Sheets

ELECTRIC POWER STEERING APPARATUS

BACKGROUND OF THE INVENTION

1. Field of the Invention

The present invention relates to improvements in an electric power steering apparatus which provides power of an electric motor to the steering system of a vehicle to thereby reduce the manual steering effort or force needed to turn the steering wheel.

2. Description of the Related Art

There are known electric power steering apparatus in which as shown in Japanese Patent Publication No. HEI 7-94227, when an ignition switch is deactivated or switched off during operation of the apparatus, a steering assist force or torque generated by an electric motor is caused to gradually decrease with time.

The conventional electric power steering apparatus is constructed to stop operation of the electric motor to terminate supply of the steering assist force to the steering system when the ignition switch is switched off. Accordingly, if a sensor signal indicative of the off state of the ignition switch is output during movement of the vehicle due to a failure in a sensor provided to detect the on state of the ignition switch, supply of electric power to the electric motor will be stopped to thereby terminate supply of the steering assist force to the steering system even though the vehicle is actually in the running state with the engine operating continuously. Since there is no power assist available from the electric motor, a great muscular effort or force should be exerted by the driver to turn the steering wheel. Additionally, such steering operation is contrary to the driver's anticipative power-assisted steering operation and hence disconcerts the driver. As a result, the steering operation is performed unnaturally and a good steering feel cannot not be obtained.

One solution for the foregoing problems may include an arrangement in which the electric motor can be driven independently from detection of operating condition of the ignition switch. This arrangement, however, has another problem that if the steering wheel is turned repeatedly during stop of the engine with the ignition switch kept in the ON state, the battery will become discharged in a relatively short period of use because the battery power is consumed by the electric motor without being recharged by the alternator which is connected in driven relation to the engine.

SUMMARY OF THE INVENTION

With the foregoing drawbacks in view, it is an object of the present invention to provide an electric power steering apparatus which can continue operation of an electric motor to apply a steering assist force to the steering system of a vehicle while the vehicle is running even if a detecting device, such as an ignition sensor, for detecting an operating condition of an ignition switch causes an operation failure generally called "off failure" (where a signal indicative of an off state of the ignition switch is continuously output from the detecting device).

According to a first aspect of the present invention, there is provided an electric power steering apparatus for a vehicle, comprising: an electric motor for applying a steering assist force to a steering system of the vehicle; a control unit for generating a motor control signal on the basis of at least a steering torque applied to the steering system; a motor drive unit for driving the electric motor on the basis of the motor control signal; an ignition sensor for detecting an operating condition of an ignition switch of the vehicle; an engine running-state sensor for detecting a running state of an engine of the vehicle and generating an engine running-state signal corresponding to the detected running state of the engine; and a protection circuit for stopping operation of the electric motor when a signal indicative of an off state of the ignition switch (ignition off signal) is supplied from the ignition sensor and the engine running-state signal supplied from the engine running-state sensor falls below a predetermined value.

Even if a signal indicative of an ignition on state of the ignition switch (ignition on signal) is not supplied from the ignition sensor, when the engine running-state signal is above the predetermined value, the vehicle is regarded as being in the running state and operation of the electric motor is continued to apply the steering assist force to the steering system.

According to a second aspect of the present invention, there is provided an electric power steering apparatus which differs from the apparatus of the first aspect in that in place of the engine running-state sensor, a vehicle velocity sensor is provided for detecting a running-state of the vehicle and generating a vehicle velocity signal corresponding to the detected running-state of the vehicle. The protection circuit is arranged to stop operation of the electric motor when the ignition off signal is supplied from the ignition sensor and the vehicle running-state signal supplied from the vehicle velocity sensor falls below a predetermined value.

Even if an ignition on signal is not supplied from the ignition sensor, when the vehicle running-state signal is above the predetermined value, the vehicle is regarded as being in the running state and operation of the electric motor is continued to apply the steering assist force to the steering system.

An electric power steering apparatus provided in accordance with a third aspect of the present invention differs from the apparatuses of the first and second aspects in that it includes both of the engine running-state sensor and the vehicle velocity sensor, and in that the protection circuit is operable to stop operation of the motor when the ignition off signal is supplied from the ignition sensor, the engine running-state signal supplied from the engine running-state sensor falls below a first predetermined value, and the vehicle running-state signal supplied from the vehicle velocity sensor falls below a second predetermined value.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
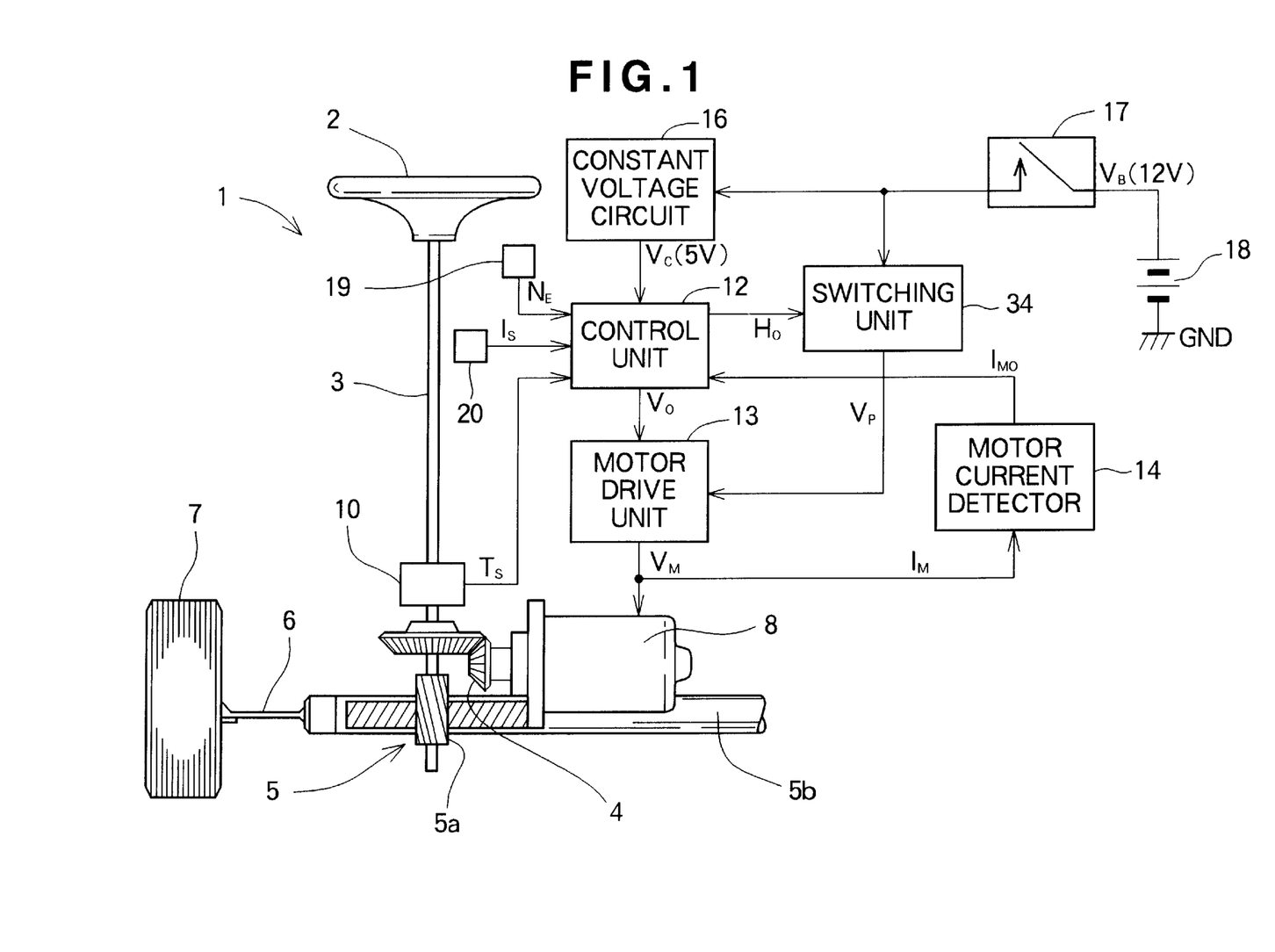
FIG. 1 is a diagrammatical view showing the general construction of an electric power steering apparatus according to a first embodiment of the present invention.

Referring now to FIG. 1, there is shown the general construction of an electric power steering apparatus for a vehicle according to a first embodiment of the present invention. The electric power steering apparatus 1 generally comprises a steering wheel 2, a steering column or shaft 3 connected at its upper end to a central portion of the steering wheel 2, a hypoid gear set 4 assembled with a lower end portion of the steering shaft 3, a rack-and-pinion mechanism 5 composed of a pinion 5a provided at the lower end of the steering shaft 3 and a rack shaft 5b having a rack of gear teeth (not designated) meshing with the pinion 5a, a tie rod 6 connected to each end of the rack shaft 5b, a steerable front wheel 7 connected to the rack shaft 5b via the tie rod 6, and an electric motor 8 for generating a steering assist force or torque. The components 2, 3, 5, 6 and 7 jointly form a steering system of the vehicle. The steering assist torque generated by the electric motor 8 is applied to the steering system via the hypoid gear set 4.

The electric power steering system 1 further includes a steering torque sensor 10 for detecting a steering torque acting in the steering system when the steering wheel 2 is turned and generating a steering torque signal Ts in terms of an electric signal corresponding to the detected steering torque, a control means or unit 12 for, on the basis of the steering torque signal Ts, setting a target current signal IMS needed to drive the electric motor 8 and generating a motor control signal Vo corresponding to the target current signal IMS, a motor drive means or unit 13 for PWM (pulse-width modulation) controlling the electric motor 8 by using a motor voltage VM determined on the basis of the motor control signal Vo, and a motor current detecting means or sensor 14 for detecting a motor current Im when the electric motor 8 is rotating in a forward or a reverse rotation and generating a motor current detection signal IMO corresponding to the detected motor current IN.

Figure 2:
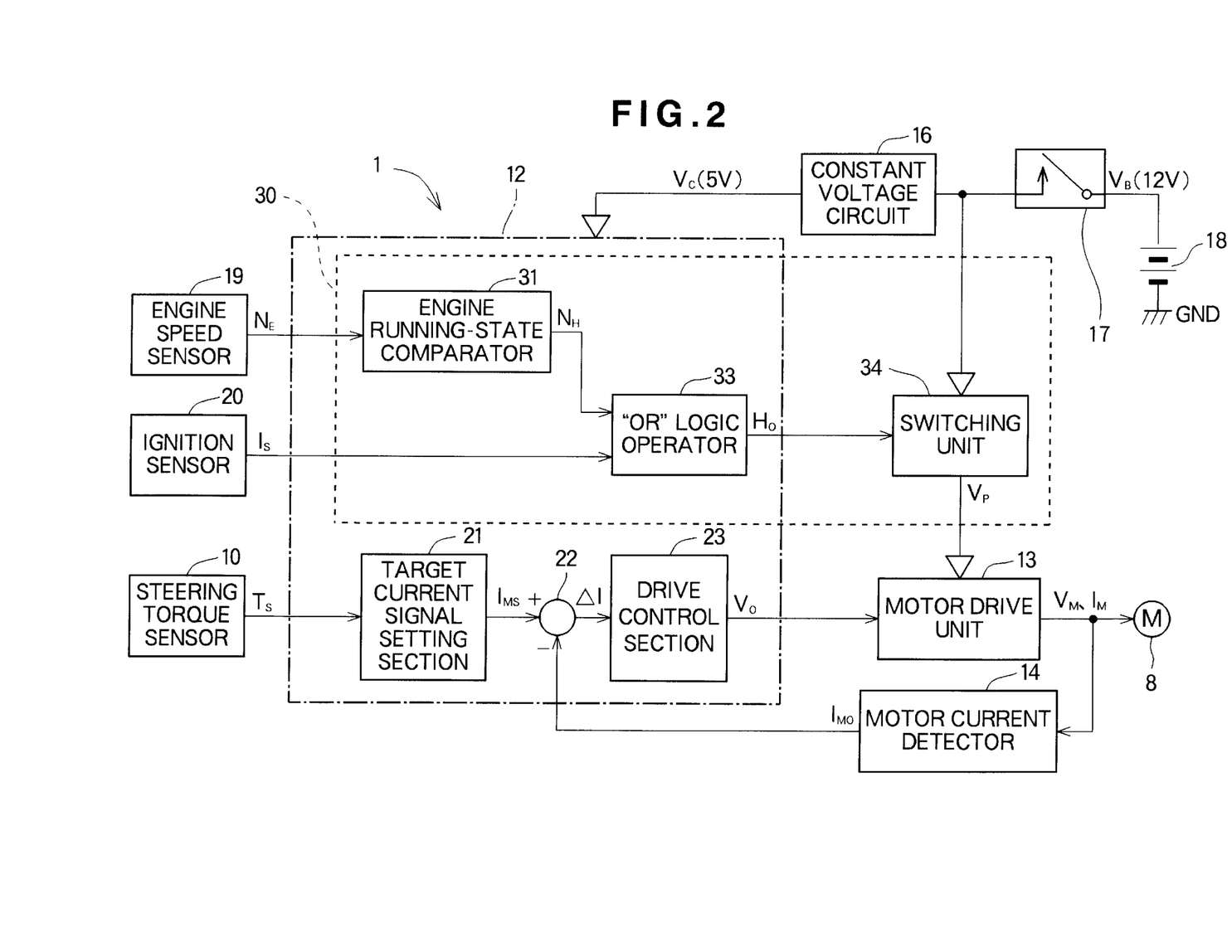
FIG. 2 is a block diagram showing a main portion of the electric power steering apparatus.

Additionally, the electric power steering apparatus 1 includes an ignition sensor 20 for detecting an on state of an ignition switch 17 of the vehicle and generating an ignition on signal Is, and an engine running-state sensor 19 for detecting a running state of an engine of the vehicle. In the illustrated embodiment, the engine running-state sensor 19 is comprised of an engine speed (rpm) sensor for detecting a speed (rpm) of the engine and generating an engine speed signal NE in terms of an electric signal corresponding to the detected engine speed. The control unit 12, when it judges the vehicle to be in the running state on the basis of the ignition on signal Is or the engine speed signal NE, outputs a logic signal Ho to activate a switching means or unit 34 to permit a power supply voltage VB (12V) to be supplied from a battery 18 through the switching unit 34 to the motor drive unit 13 to thereby activate or drive the motor drive unit 13. The switching unit 34 forms part of a protection means or circuit 50 (FIG. 2).

An ignition switch 17 is manually turned on by the driver when the vehicle is to be started. When the ignition switch 17 is turned on, the power supply voltage VB (12V) from the battery 18 is supplied to the switching unit 34 and a constant voltage circuit 16. The constant voltage circuit 16 steps down the power supply voltage VB (12V) and generates a constant voltage Vc (5V) for driving the control unit 12 and the motor current sensor 14. Thus, when the ignition switch 17 is switched on by the driver, a constant voltage Vc (5V) is supplied from the constant voltage circuit 16 to the control unit 12 and thereby activates the control unit 12. At the same time, the ignition sensor 20 detects the on state of the ignition switch 17 and supplies an ignition on signal Is (signal indicative of the ignition on state of the ignition switch 17) to the control unit 12. Upon activation of the control unit 12, the engine speed sensor 19 starts detecting an engine speed and supplies an engine speed signal NE to the control unit 12.

When the steering wheel 2 is turned by the driver while the control unit 12 is in the activated condition, the steering torque sensor 10 associated with the steering shaft 3 detects a steering torque applied to the steering shaft 3 and supplies a steering torque signal Ts corresponding to the detected steering torque to the control unit 12. The steering torque applied to the steering shaft 3 rotates the pinion 5a. Rotation of the pinion 5a is translated by the rack-and-pinion mechanism 5 into an axial reciprocating movement of the rack shaft 5b which in turn is transmitted via the tie rods 6 to the front wheels 7 (only one being shown) to thereby pivot the front wheels 7.

When the vehicle is in the running state, the ignition on signal Is (at a high (H) level, for example, or a logical one signal) is continuously supplied from the ignition sensor 20 to the control unit 12. In this instance, if an engine speed signal NE indicative of the running state of the engine is continuously supplied from the engine speed sensor 19 to the control unit 12, the control unit 12 will judge the vehicle to be in the running state and thus supplies a logic signal Ho (at a high (H) level, for example, or a logical one signal) to the switching unit 34 to thereby keep the switching unit 34 in an activated or on state with the result that the power supply voltage VB (12V) from the battery 18 is continuously supplied to the motor drive unit 13 as a power source VP.

On the other hand, during operation of the electric power steering apparatus, when an engine speed signal NE corresponding to an engine speed (such as 490 rpm or less) below a predetermined value (such as 500 rpm) is supplied from the engine speed sensor 19 to the control unit 12, with an ignition off signal (at a low (L) level or a logical zero signal) having been supplied from the ignition sensor 20 to the control unit 12 due to an off failure caused in the ignition sensor 20, the control unit 12 judges the vehicle to be in the stopped state and thus supplies a logic signal Ho (at a low (L) level or a logical zero signal) to the switching unit 34 to thereby deactivate the switching unit 34 with the result that supply of the power supply voltage VB (12V) from the battery 18 to the motor drive unit 13 is terminated.

Even if the ignition off signal Is is supplied from the ignition sensor 20 during operation of the electric power steering apparatus 1, when the engine speed signal NE is above the predetermined value (NE≧500 rpm), the control unit 12 judges the vehicle is to be in the running state and continuously supplies the logic signal Ho (at the high (H)

level) to the switching unit 34 to thereby keep the switching unit 34 in the activated or on state with the result that the power supply voltage VB (12V) from the battery 18 is continuously supplied to the motor drive unit 13 as a power source VP to drive the electric motor 8.

Thus, the control unit 12 deactivates the switching unit 34 to terminate supply of the power supply voltage VB (12V) from the battery 18 to the motor drive unit 13, on the basis of the presence of the ignition off signal IS and an engine speed signal NE below the predetermined value. Even if the ignition on signal is not supplied due to a failure of the ignition sensor 20, when the engine speed signal NE is above the predetermined value, the control unit 12 judges the vehicle is in the running state with the engine operating continuously and thus supplies the power supply voltage VB (12V) from the battery 18 to the motor drive unit 13 through the switching unit 34 to thereby continue operation of the electric motor 8 to apply an appropriate steering assist force to the steering system.

The motor drive unit 13 comprises a bridge circuit (not shown) consisting of four switching elements such as power FETs or insulated-gate bipolar transistors. The motor drive unit 13 generates a motor voltage Vm corresponding to the motor control signal Vo (PWM signal) supplied from the control unit 12, so as to drive the electric motor 8 in the forward or the reverse direction. A motor current IM thus caused to flow in the electric motor 8 has an intensity and a direction corresponding to an absolute value and a direction of the steering torque T, respectively. A motor torque generated by the electric motor 8 is translated into a steering assist force or torque as it is multiplication by the hypoid gear set 4, and the steering assist torque is applied to the steering shaft 3.

The motor current sensor 14 is a component that uses a resistance or a Hall element to convert the motor current IM flowing actually in the electric motor 8 into a voltage and reconverts the thus obtained voltage into a corresponding motor current detection signal IMO. The motor current detection signal IMO is fed back to the control unit 12 for negative feedback control of the target current signal IMS.

The control unit 12 controls such that an offset ΔI between the target current signal IMS and the motor current detection signal IMO renders zero (0) promptly to thereby make the motor current IM in exact correspondence to the target current signal IMS.

Reference is made to FIG. 2 which shows in block diagram a main portion of the electric power steering apparatus The control unit 12 is a microprocessor-based electronic control unit including various arithmetic and logic units, processors and memories (none of them being shown). As shown in FIG. 2, this unit 12 includes a target current signal setting means or section 21, an offset calculating means or section 22, and a drive control means or section 23.

The target current signal setting section 21 includes a memory such as a ROM (not shown) which stores on a permanent base a table of correlated data collected either theoretically or experimentally in advance about the target current signal IMS and the steering torque signal TS. When supplied with a steering torque signal TS from the steering torque sensor 10, the target current signal setting part 21 retrieves, from the correlative data table stored in the ROM, a piece of target current signal data (IMS) corresponding to the supplied steering torque signal and outputs the retrieved data piece to the offset calculating section 22 as a target current signal IMS.

The offset calculating section 22 comprises a subtractor or a software-controlled subtracting function (neither shown). This section 22 calculates an offset or difference ΔI between the target current signal IMS supplied from the target current signal setting section 21 and the motor current IM detected by the motor current sensor 14 and supplies an offset signal (corresponding to the calculated offset) ΔI to the drive control section 23.

The drive control section 23 includes a PID controller, a PWM signal generator and so on (none of them being shown). In this section 23, PID (proportional and integral and derivative) control is carried out for the offset signal ΔI to generate a composite signal on the basis of the respective outputs from the proportional, integral and derivative control actions. In order to control the direction and magnitude of a torque to be generated from the electric motor 8 on the basis of the composite signal, the drive control section 23 generates a motor control signal Vo consisting of a combination of an ON signal VON and a PWM control signal VPWM and supplies this motor control signal Vo to the motor drive unit 13.

The motor drive unit 13, composed of a bridge circuit consisting of four switching elements as described above, is controllably driven or activated by the motor control signal Vo and generates a motor voltage VM having a driving direction and an intensity. The motor voltage VM is supplied to the electric motor 8 to drive the same with a motor current IM supplied therewith.

As a power source VP used for generating the motor voltage VM, the power supply voltage VB (12V) from the battery is supplied through the switching unit 34 to the motor drive unit 13.

The electric motor 8 is a dc motor or a brush-less motor, and when it is driven by the PWM-controlled motor voltage VM of a direction and an intensity supplied from the motor drive unit 13, the electric motor 8 generates a power proportional to the electric motor current IM. The output power of the electric motor 8 is applied to the steering system as a steering assist force or torque.

The motor current sensor 14, comprised of a current sensor using a Hall element or a sensor using a resistance to detect current as voltage, detects a motor current IM flowing in the electric motor 8 and feeds the detected motor current IM back to the offset calculating section 22 (negative feed back) as a motor current detection signal IMO.

The control unit 12 further includes a running-state comparing means or comparator 31, and an "OR" logic operating means or operator 33. The running-state comparator 31, the OR logic operator 33 and the above-mentioned switching unit 34 jointly constitute an protection means or circuit 30.

The protection circuit 30 operates such that when an engine speed signal NE corresponding to an engine speed above the predetermined value (such as 500 rpm) is supplied from the engine speed sensor 19 even though the ignition on signal IS (at the high (H) level) indicative of the on state of the ignition switch 17 is not supplied during operation of the electric power steering apparatus 1 due to a failure of the ignition sensor 20, the switching unit 34 is kept in the activated or on state to permit the power source VP (battery power source=12V) to be supplied to the motor drive unit 13, thereby continue operation of the electric motor 8 to provide an appropriate steering assist force to the steering system.

Alternatively, when the ignition off signal IS (at the low (L) level) is supplied during operation of the electric power steering apparatus and, at the same time, the engine speed signal NE falls below the predetermined value (500 rpm), the control unit 12 deactivates the switching unit 34 to terminate supply of the power source VP (battery power source=12V) to the motor drive unit 13 to thereby stop operation of the electric motor 8.

The running-state comparator 31 includes a comparator or a software-controlled comparing function. This comparator 31 compares the engine speed signal NE supplied from the engine speed sensor 19 and a preset reference engine speed NK (500 rpm as specified above) and provides a high (H) level running-state comparison signal (logical one signal) NH to the OR logic operator 33 when NE≧NK and a low (L) level drive comparison signal (logical zero signal) NH when NE <NK.

The OR logic operator 33 includes an OR circuit or a software-controlled logical inclusive OR function. The OR logic operator 33 performs a logical OR operation on the running-state comparison signal NH supplied from the running state comparator 31 and the signal IS (ignition on signal or ignition off signal) supplied from the ignition sensor 20 and provides a logic signal HO (logical one signal or logical zero signal) to the switching unit 34.

The switching unit 34 comprises a relay circuit including a relay having a normally open contact pair. By the high level logic signal (logical one signal) HO which is supplied from the OR logic operator 33 when at least one of the running-state comparison signal NH and the ignition on signal IS is at the high (H) level, the switching unit 34 is activated to close the normally open contact pair, thereby making a circuit to start or continue supply of the power supply voltage VB (=12V) from the battery 18 to the motor drive unit 13.

The switching unit 34, on the basis of the low (L) level logic signal (logical zero signal) HO supplied from the OR logic operator 33 when the ignition on signal IS and the running-state comparison signal NH are both at the low (L) level, opens its contact pair to break the circuit between the battery 18 and the motor drive unit 13, thereby terminating supply of the power source VP to the motor drive unit 13.

Although in the illustrated embodiment, the engine running-state detecting means or sensor is an engine speed (rpm) sensor, it may be in the form of an alternator (not shown) which generates an ac power to charge the battery 18 while the engine is running. The alternator detects running of the engine when it generates a voltage above a predetermined level.

Figure 3:
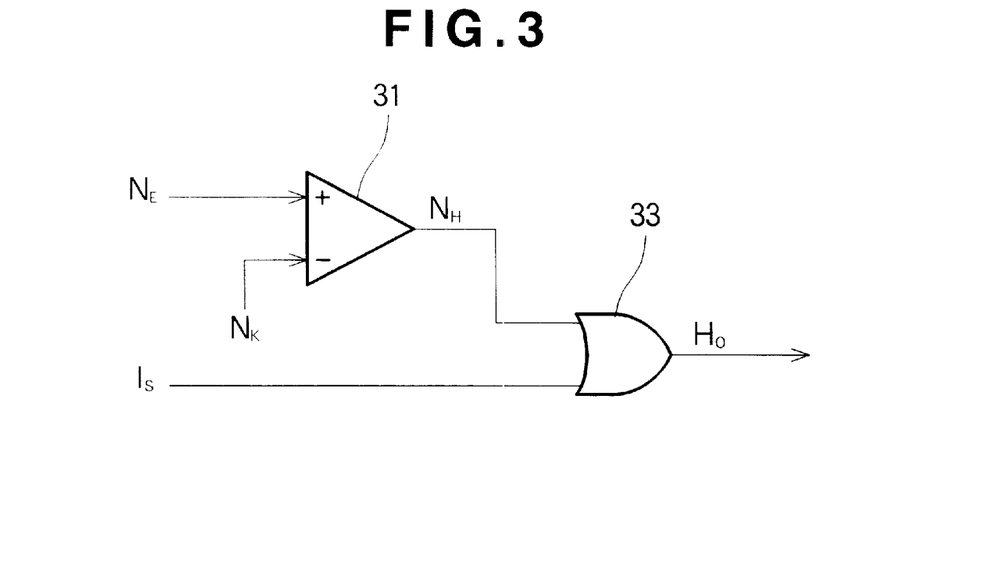
FIG. 3 is a circuit diagram showing an engine running-state comparator and an OR logic operator of a protection circuit of the electric power steering apparatus.

FIG. 3 shows a preferred form of the running-state comparator 31, and the OR logic operator 33 that form part of the protection circuit 30. In this figure, the comparator 31 and the OR logic operator 33 are illustrated as being an operational amplifier, and an OR gate, respectively. The logic signal HO supplied from the OR gate (OR logic operator) 33 is at the high (H) level when at lease one of the running-state comparison signal NH supplied from the running-state comparator 31 and the ignition signal IS is at the high (H) level. On the basis of the high (H) level logic signal HO, the control unit 12 judges the vehicle to be in the running state with the engine operating continuously. On the other hand, when the running-state comparison signal NH and the ignition on signal IS are both at the low (L) level, the logic signal HO supplied from the OR gate 33 is at the low (L) level. The low (L) level logic signal HO means that the vehicle is judged to be in the stopped condition.

Figure 4:
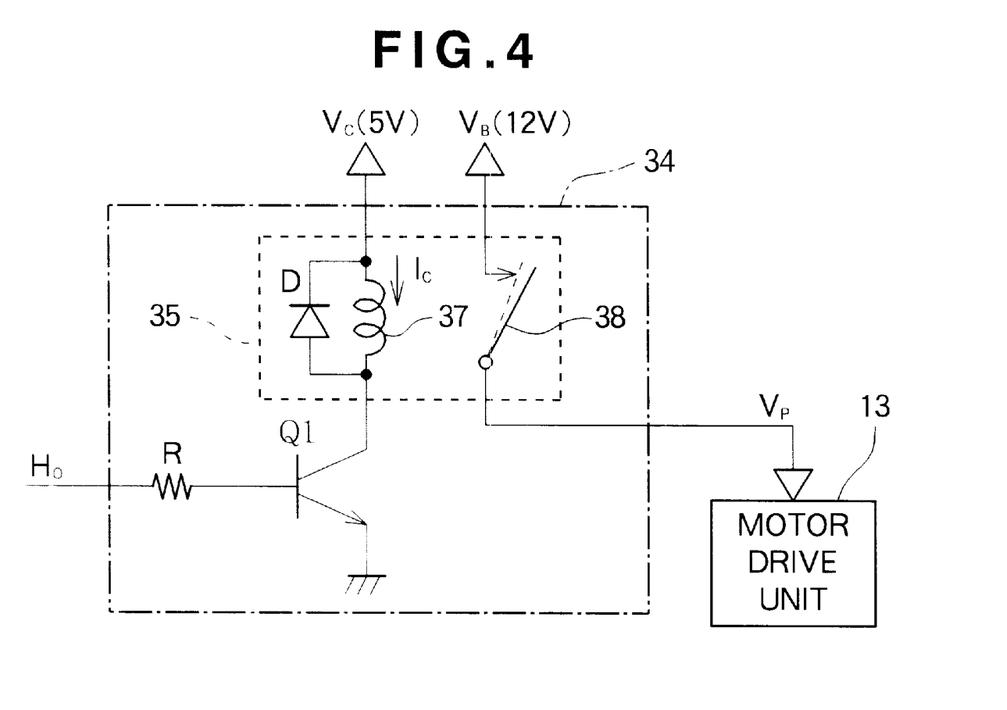
FIG. 4 is a circuit diagram showing a switching unit of the protection circuit.

Reference is made to FIG. 4 which shows in circuit diagram the switching unit 34 previously described. As shown in this figure, the switching unit 34 is comprised of a relay circuit 35 and a relay drive circuit which is composed of a resistance R and a transistor Q1. The relay circuit 35 includes a relay coil 37 and a normally open relay contact 38. Thus, the relay circuit 35 consists of a normally open contact relay. One end of the relay coil 37 is connected to the constant voltage source VC (5V). One end of the relay contact 38 is connected to the power source VE (12V) of the battery 18.

The relay contact 38 is a normally open contact. Accordingly, when the relay coil 37 is not energized (i.e., there is no current IC flowing in the relay coil 37), the relay contact 38 is kept in its open position (indicated by the solid line) to thereby disconnect the motor drive unit 13 and the power source VE (12V). Thus, the power source VP (equal to VE=12V) is not supplied to the motor drive unit 13. Alternately, when the relay coil 37 is energized, the relay contact 38 moves from the open position to a closed position (indicated by the broken line) to thereby turn on or activate the relay (relay circuit) 35, allowing the power source VP (equal to VE=12V) to be supplied to the motor drive unit 13.

With the relay circuit 35 thus arranged, when a high (H) level logic signal (logical one signal) HO from the OR logic operator 33 (FIG. 3) is supplied through the resistance R to the transistor Q1, the transistor Q1 conducts or turns on, causing a coil current IC to flow through the relay coil 37 to thereby close the relay contact 38. Thus, the power source VP (equal to VE=12V) is supplied through the relay (relay circuit) 35 to the motor drive unit 13. Conversely, when the logic signal HO supplied to the relay drive circuit is at the low (L) level (logical zero signal), the transistor Q1 does not conduct. The relay coil 37 is, therefore, kept de-energized to keep the relay contact 38 in the open position. Accordingly, the power source VP (equal to VE=12V) is not supplied through the relay (relay circuit) 35 to the motor drive unit 13.

Figure 5:
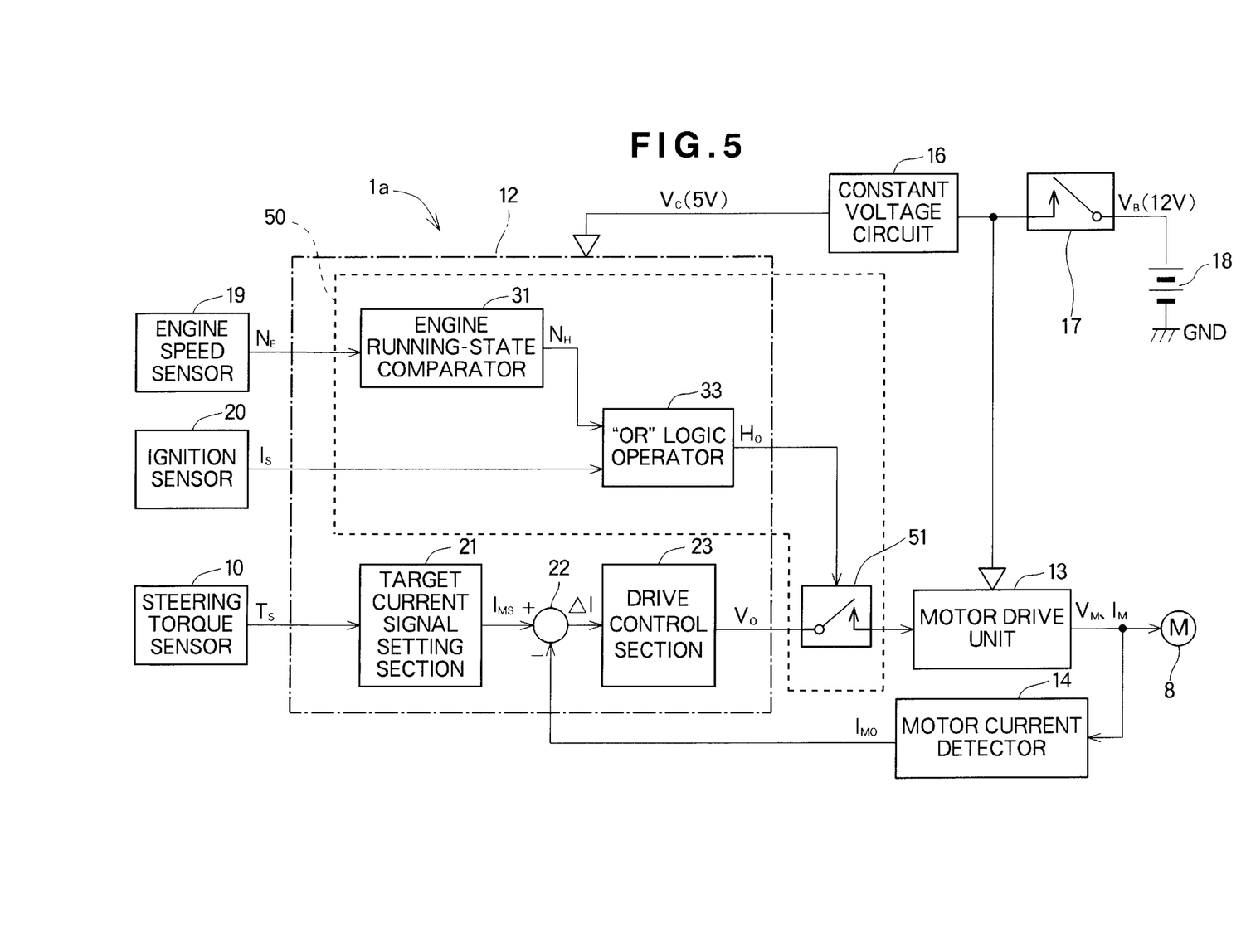
FIG. 5 is a view similar to FIG. 2, but showing a modified form of the electric power steering apparatus.

Reference is made to FIG. 5 which shows in block diagram a modification of the electric power steering apparatus 1 according to the present invention.

The modified electric power steering apparatus 1a differs from the one 1 shown FIGS. 1 and 2 in that a protection means or circuit 50 has a switching unit 51 disposed between the drive control unit 23 and the motor drive unit 13 to selectively permit and block supply of the motor control signal V0 from the drive control unit 23 to the motor drive unit 13, thereby enabling the motor drive unit 13 to start and stop operation of the electric motor 8.

Though not shown, the switching unit 51 may be arranged to selectively interrupt passage of the target current signal IMS or the offset signal ΔI. Additionally, when used in conjunction with interruption of the motor control signal V0, the target current signal IMS or the offset signal ΔI, the switching unit 34 may be a simple switching element (such as a transistor, a field-effect transistor or the like) operable by the constant voltage power source VC (5V) or a software-controlled switching function.

Figure 6:
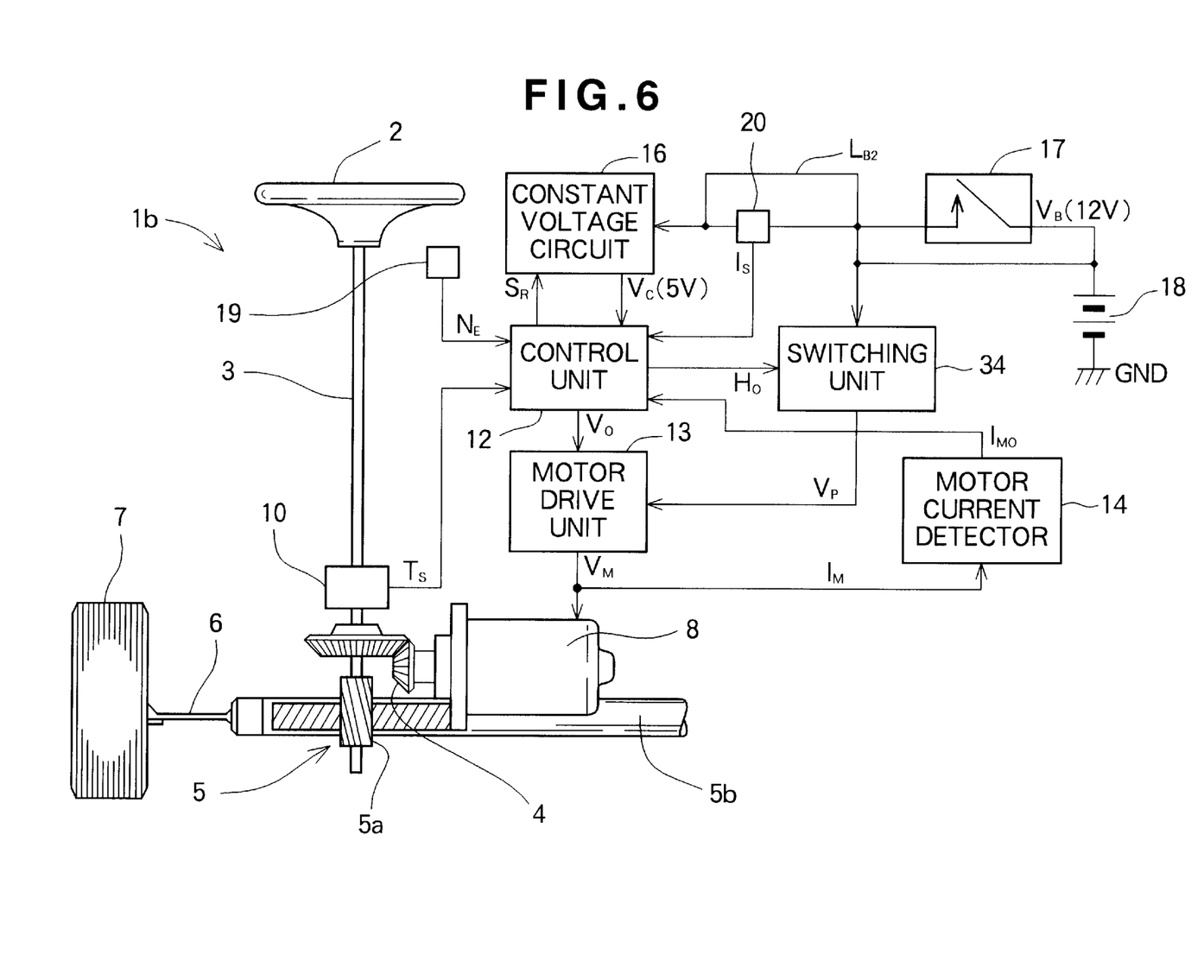
FIG. 6 is a view similar to FIG. 1, but showing another modified form of the electric power steering apparatus.

FIG. 6 shows another modified electric power steering apparatus 1b according to the present invention. The modified apparatus 1b differs from the one 1 shown in FIG. 1 in that a first connecting line LB1 interconnecting the battery 18 and the switching unit 34 and a second connecting line LB2 interconnecting the switching unit 34 and the constant voltage circuit 16 are additionally provided.

With the connecting lines LB1, LB2 thus provided, it is possible for the control unit 12 to perform a control operation such that when the ignition off signal IS is output from the ignition sensor 20 and, at the same time, the engine speed signal NE supplied from the engine speed sensor 19 falls below the predetermined value, the motor current $I_M$ flowing in the electric motor 8 is caused to gradually decrease with time, thereby prevent the electric motor 8 from stopping in immediate response to deactivation of the switching unit 34. This control operation provide a gentle change in steering feeling when the vehicle is stopped.

At the end of a predetermined period set after generation of the ignition off signal $I_S$ and the engine speed signal $N_E$ below the predetermined value, the control unit 12 supplies a control signal $S_R$ to the constant voltage circuit 16 to terminate supply of the constant voltage $V_C$ from the constant voltage circuit 16 to the control unit 12, thereby stopping operation of the electric power steering apparatus 1b.

As described above, the electric power steering apparatuses 1, 1a, 1b according to the first embodiment are each provided with an engine running-state sensor 19 for detecting a running state of the engine of a vehicle. When an ignition off signal $I_S$ is supplied from an ignition sensor 20 and, at the same time, an engine speed signal $N_E$ supplied from the engine running-state sensor 19 falls below a predetermined value, a protection circuit 30 (50) of the apparatus stops operation of an electric motor 8. Accordingly, even if an ignition on signal $I_S$ is not supplied from the ignition sensor 20, the vehicle is regarded as being in the running state as long as the engine speed signal $N_E$ is above the predetermined value and, hence, the electric motor 8 is kept operative to continue application of a steering assist force or torque to a steering system of the vehicle.

Figure 7:
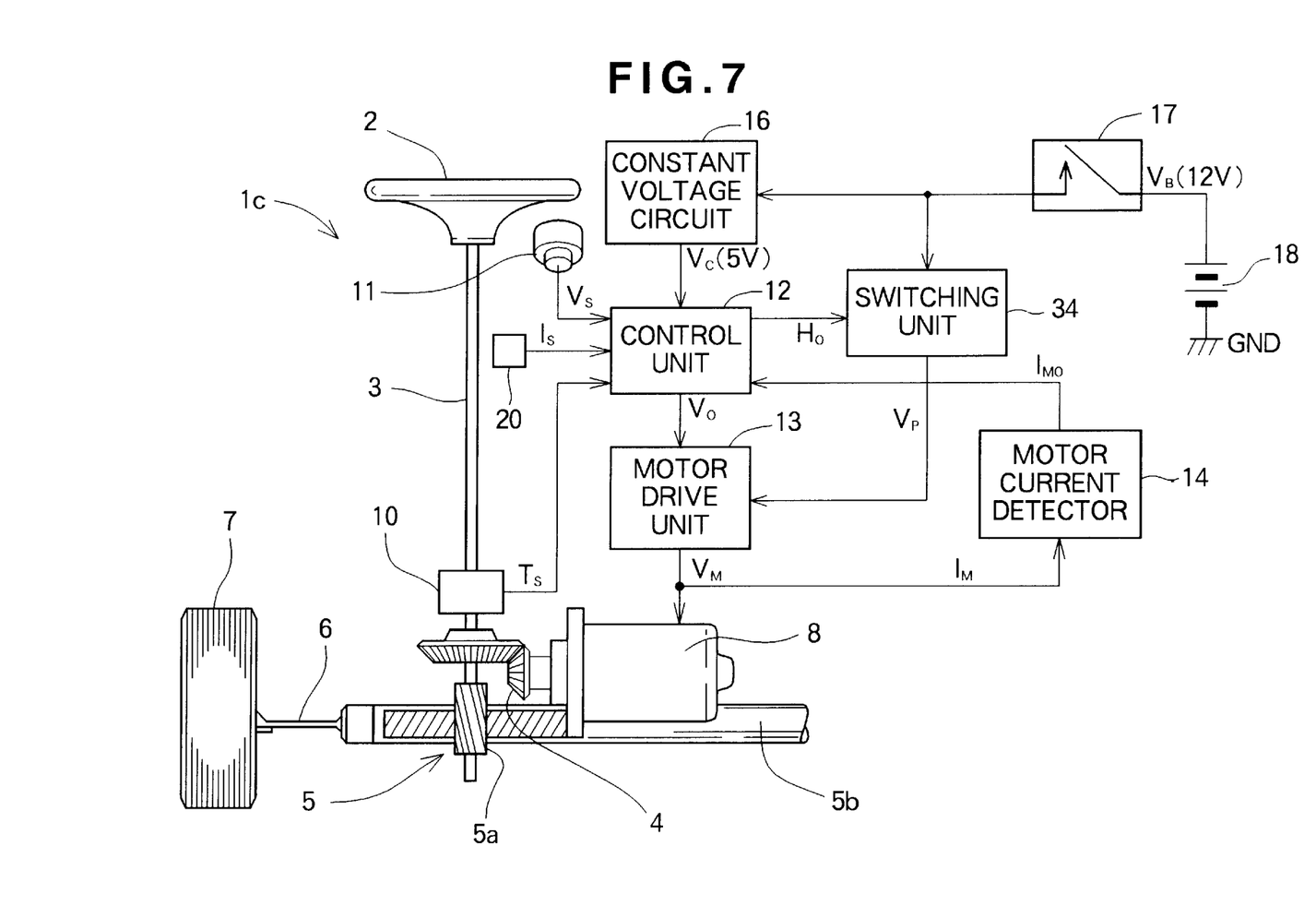
FIG. 7 is a diagrammatical view showing the general construction of an electric power steering apparatus according to a second embodiment of the present invention.

FIG. 7 schematically shows the general construction of an electric power steering apparatus 1c according to a second embodiment of the present invention. The apparatus 1c substantially the same as the one 1 of the first embodiment shown in FIG. 1 with the exception that a vehicle velocity sensor 11 and a control unit 15 are used in place of the engine speed sensor 19 and the control unit 12.

The vehicle velocity sensor 11 detects a running-state of the vehicle and generates a vehicle velocity signal $V_S$ in terms of an electric signal corresponding to the detected vehicle running-state (velocity) of the vehicle. The vehicle velocity signal $V_S$ is supplied to the control unit 15.

An ignition sensor 20 detects the on state of an ignition switch 17 and supplies an ignition on signal $I_S$ to the control unit 15.

The control unit 15 judges, on the basis of the ignition on signal $I_S$ (at a high (H) level, for example) from the ignition sensor 20 and the vehicle velocity signal $V_S$ from the vehicle velocity sensor 11, the vehicle to be in the running state and thus supplies a logic signal $H_O$ (at a high (H) level, for example) to a switching unit 34 to activate or turn on the switching unit 34, thereby supplying a power supply voltage $V_B$ (12V) from a battery 18 to a motor drive unit 13 as a power source $V_P$.

Figure 8:
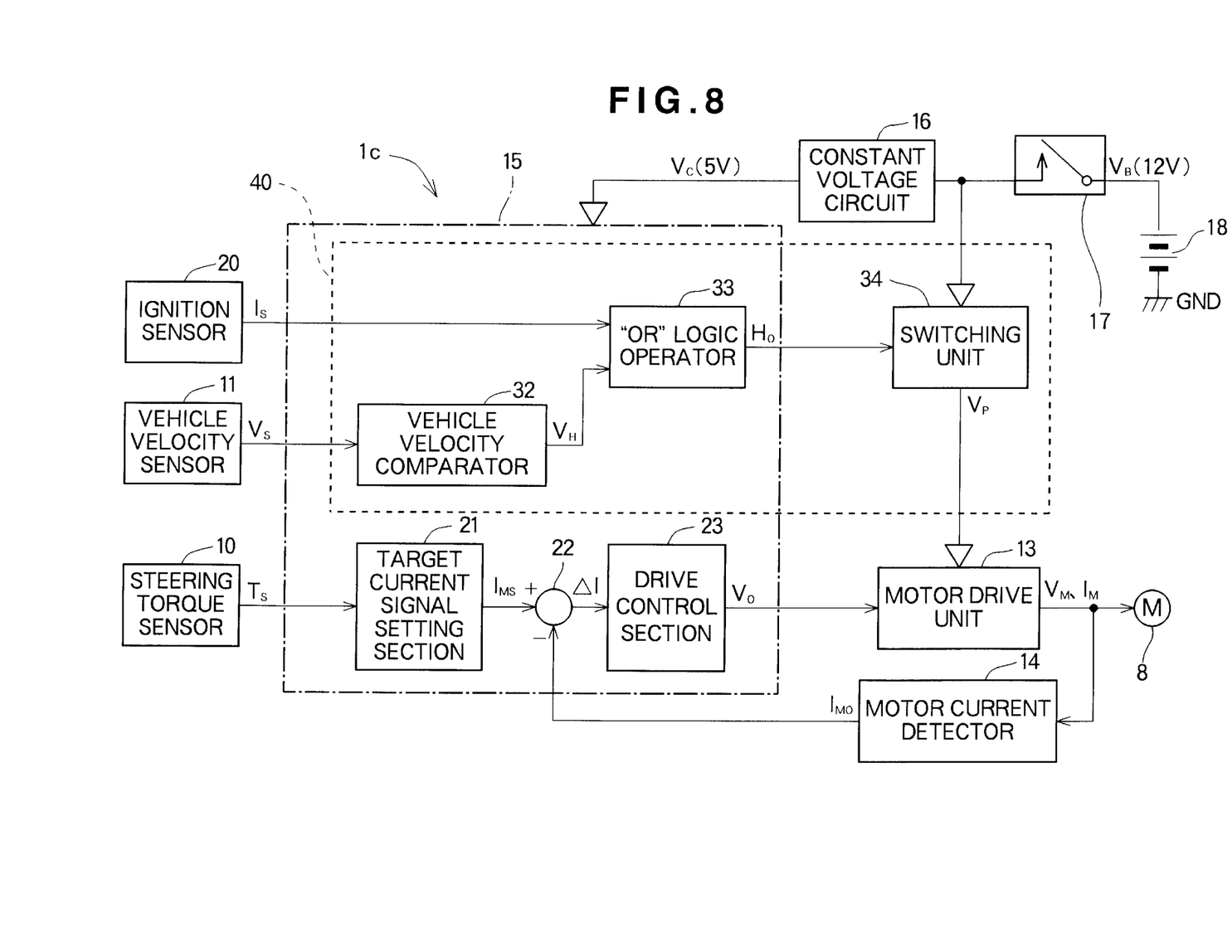
FIG. 8 is a block diagram showing a main portion of the electric power steering apparatus shown in FIG. 7.

Reference is made to FIG. 8 which shows in block diagram a main portion of the electric power steering apparatus 1c. As shown in this figure, the apparatus 1c includes a protection means or circuit 40 which is composed of a vehicle velocity comparing means or comparator 32, an OR logic operator 33 and the above-mentioned switching means or unit 34.

During operation of the electric power steering apparatus 1c, when the vehicle velocity signal $V_S$ supplied from the vehicle velocity sensor 11 is above a predetermined value (such as 10 km/h), the protection circuit 40 keeps the switching unit 34 in the activated or on state to continue supply of the power source $V_P$ (equal to the power supply voltage $V_B$=12V) to the motor drive unit 13 for driving the electric motor 8 to apply an appropriate steering assist force to the steering system even if the ignition on signal $I_S$ is not supplied from the ignition sensor 20 (when the $I_S$ is at a low (L) level, for example) due to a failure in the ignition sensor 20.

During operation of the electric power steering apparatus 1c, when the ignition off signal $I_S$ is supplied and, at the same time, the vehicle velocity signal $V_S$ falls below the predetermined value, the protection circuit 40 deactivates the switching unit 34 to terminate supply of the the power source $V_P$ (battery power supply voltage $V_B$=12V) to the motor drive unit 13, thereby stopping operation of the electric motor 8.

The vehicle velocity comparator 32 includes a comparator or a software-controlled comparing function. This comparator 32 compares the vehicle velocity signal $V_S$ supplied from the vehicle velocity sensor 11 with a preset reference vehicle velocity $V_K$ (10 km/h as specified above) and provides a high (H) level drive comparison signal (logical one signal) $V_H$ to the OR logic operator 33 when $V_S \geq V_K$ and a low (L) level drive comparison signal (logical zero signal) $V_H$ when $V_S < V_K$.

The OR logic operator 33 includes an OR circuit or a software-controlled logical inclusive OR function. The OR logic operator 33 performs a logical OR operation on the vehicle velocity signal $V_H$ supplied from the vehicle velocity comparator 32 and the ignition on signal $I_S$ supplied from the ignition sensor 20 and supplies a logic signal $H_O$ to the switching unit 34.

The switching unit 34 comprises a relay circuit including a relay having a normally open contact pair. By the high level logic signal $H_O$ which is supplied from the OR logic operator 33 when at least one of the vehicle velocity comparison signal $V_H$ and the ignition on signal $I_S$ is at the high (H) level, the switching unit 34 is activated to close the normally open contact pair, thereby making a circuit to start or continue supply of the power supply voltage $V_B$ (=12V) from the battery 18 to the motor drive unit 13 as the power source $V_P$.

The switching unit 34, on the basis of the low (L) level logic signal $H_O$ supplied from the OR logic operator 33 when the ignition on signal $I_S$ and the vehicle velocity comparison signal $V_H$ are both at the low (L) level, opens its contact pair to break the circuit between the battery 18 and the motor drive unit 13, thereby terminating supply of the power source $V_P$ to the motor drive unit 13.

Figure 9:
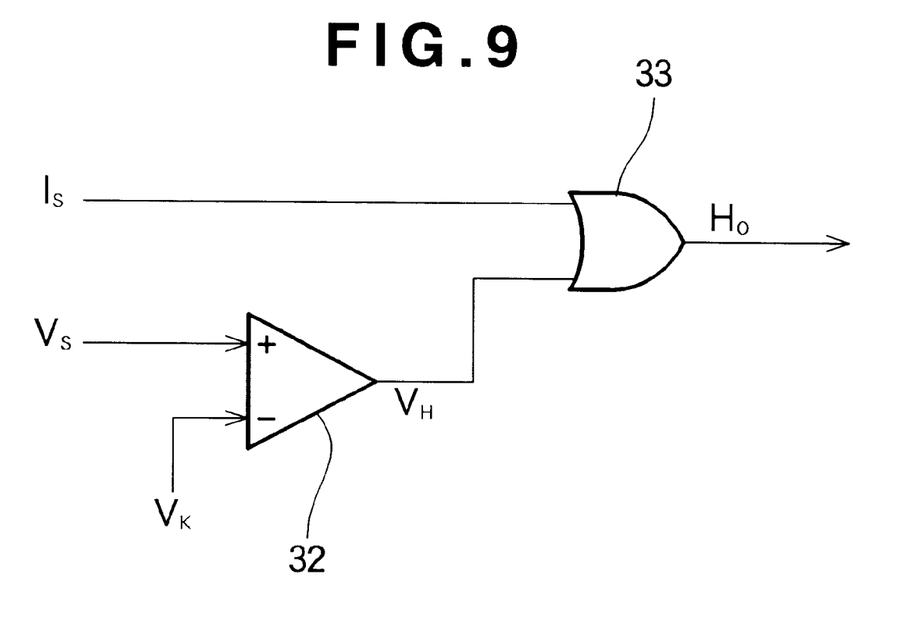
FIG. 9 is a circuit diagram showing a vehicle velocity comparator and an OR logic operator of a protection circuit of the electric power steering apparatus shown in FIG. 8.

FIG. 9 shows a preferred form of the vehicle velocity comparator 32, and the OR logic operator 33 that form part of the protection circuit 40. In this figure, the comparator 32 and the OR logic operator 33 are illustrated as being an operational amplifier, and an OR gate, respectively. The logic signal $H_O$ supplied from the OR gate (OR logic operator) 33 is at the high (H) level when at lease one of the vehicle velocity comparison signal $V_H$ and the ignition on signal $I_S$ is at the high (H) level. On the basis of the high (H) level logic signal $H_O$, the control unit 15 judges the vehicle to be in the running state with the engine operating continuously. On the other hand, when the vehicle velocity comparison signal $V_H$ and the ignition on signal $I_S$ are both at the low (L) level, the logic signal $H_O$ supplied from the OR gate 33 is at the low (L) level. The low (L) level logic signal $H_O$ means that the vehicle is judged to be in the stopped condition.

Though not shown, the switching unit 34 of the protection circuit 40 may be arranged to selectively interrupt supply of the motor control signal VO from the drive control means or section 23 to the motor drive unit 13 in the same manner as shown in FIG. 5. As a further alternative, the switching unit 34 may be arranged to selectively interrupt supply of the target current signal IMS or the offset signal ΔI. Additionally, when used in conjunction with the motor control signal VO, the target current signal IMS or the offset signal ΔI. The switching unit 34 may be a simple switching element (such as a transistor, a field-effect transistor or the like) operable by the constant voltage power source VC (5V) or a software-controlled switching function.

The electric power steering apparatus 1c may further include two connecting lines (not shown but identical to those LB1, LB2 shown in FIG. 6) so that when the switching unit 34 is deactivated to stop the electric motor 8 on the basis of the presence of the ignition off signal and the vehicle velocity signal VS below the predetermined value, the control unit 15 causes the motor current IM to gradually decrease with time to thereby prevent a sudden change in the steering feeling when the vehicle is stopped.

As is apparent from the foregoing description, the electric power steering apparatuses 1c according to the second embodiment includes a vehicle velocity sensor 11 for detecting a running state of the vehicle. When an ignition off signal IS is supplied from an ignition sensor 20 and, at the same time, a vehicle velocity signal VE supplied from vehicle velocity sensor 11 falls below a predetermined value, a protection circuit 40 of the apparatus 1c stops operation of an electric motor 8, Accordingly, even if an ignition on signal IS is not supplied from the ignition sensor 20, the vehicle is regarded as being in the running state as long as the vehicle velocity signal VE is above the predetermined value and, hence, the electric motor 8 is kept operative to continue application of a steering assist force or torque to a steering system of the vehicle.

Figure 10:
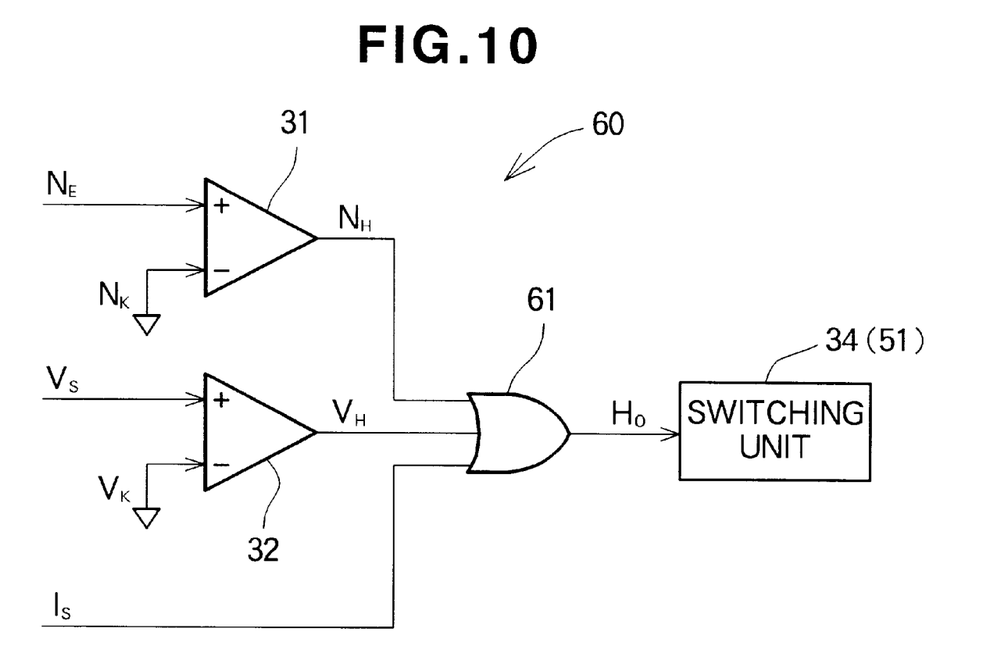
FIG. 10 is a circuit diagram showing a modified form of the protection circuit.

FIG. 10 shows in circuit diagram a modification of the protection circuit according to the present invention. The modified protection circuit 60 includes an engine running-state comparing means or comparator 31, a vehicle velocity comparing means or comparator 32, an OR logic operator 61 and a switching means or unit 34 (51). In FIG. 10, these parts which are identical or corresponding to those shown in the foregoing embodiments shown in FIGS. 1–9 are designated by the same reference characters, and a further description thereof will be omitted.

The protection circuit 60 differs from those shown in FIGS. 3 and 9 in that the OR logic operator 61 for activating and deactivating the switching unit 34 (51) comprises an OR gate having three inputs; a first input being a running-state comparison signal NH from the engine running-state sensor 31, a second input being a vehicle velocity signal VH from the vehicle velocity sensor 32, and a third input being an ignition on signal IS from the ignition sensor 20. At least one of the running-state comparison signal NH, the vehicle velocity signal VH, the ignition on signal IS is at a high (H) level, the OR logic operator 61 outputs a high (H) level logic signal HO (logical one (1) signal) to thereby activate or turn on the switching unit 34 (51).

Thus, even if the ignition on signal IS is not supplied from the ignition sensor 20, when at least one of the engine speed signal NE and the vehicle velocity signal VS is above the corresponding predetermined value NK, VK, the OR gate (OR logic operator) 61 outputs a high (H) level logic signal HO by means of which the vehicle is judged to be in the running state, and the electric motor 8 is kept in the operative condition to continue application of the steering assist force to the steering system.

When all of the running-state comparison signal NH, the vehicle velocity comparison signal VH and the ignition on signal IS are at the low (L) level, the OR logic operator 61 outputs a low (L) level logic signal HO to deactivate the switching unit 34 (51) to thereby stop operation of the electric motor 8 via the motor drive unit 13 (see FIGS. 1 and 2, for example).

As described above, in one preferred form of the present invention, there is provided an electric power steering apparatus which includes an engine running-state sensor (such as an engine speed sensor) for detecting a running state of the engine of a vehicle, and a protection circuit operable to stop operation of an electric motor when an ignition off signal is supplied from an ignition sensor and an engine running-state signal from the engine running-state sensor falls below a predetermined value. Even if an ignition on signal is not supplied from the ignition sensor, when the engine running-state signal is above the predetermined value, the vehicle is regarded as being in the running state and operation of the electric motor is continued to apply a steering assist force or torque to a steering system of the vehicle. Thus, while the vehicle is running, a good and stable steering feel can be obtained.

In another preferred form of the present invention, the electric power steering apparatus includes a vehicle velocity sensor for detecting a running-state of a vehicle, and a protection circuit operable to stop operation of an electric motor when an ignition off signal is supplied from an ignition sensor and a vehicle velocity signal from the vehicle velocity sensor falls below a predetermined value. Even if an ignition on signal is not supplied from the ignition sensor, when the vehicle velocity signal is above the predetermined value, te vehicle is regarded as being in the running state and operation of the electric motor is continued to apply a steering assist force or torque to a steering system of the vehicle. Like the first-mentioned apparatus, this electric power steering apparatus can provide a good and stable steering feel in all times during the movement of the vehicle.

Even when a failure arises in the ignition sensor during movement of the vehicle, the engine speed sensor or the vehicle velocity sensor detects the running state of the vehicle, enabling the electric motor to be driven to continuously apply an appropriate steering assist force to the steering system. Thus, while the vehicle is running, a good and stable steering feel can always be obtained.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle, comprising:

a battery;

an electric motor for applying a steering assist force to a steering system of a vehicle;

a control unit for generating a motor control signal on the basis of at least a steering torque applied to the steering system;

a motor drive unit for driving said electric motor on the basis of said motor control signal;

an ignition sensor for detecting an operating condition of an ignition switch of the vehicle;

an engine running-state sensor for detecting a running state of an engine of the vehicle and generating an engine running-state signal corresponding to the detected running state of the engine; and a protection circuit for said battery including a switching unit arranged to interrupt operation of said electric motor when a signal indicative of an ignition off state of said ignition switch is supplied from said ignition sensor and the engine running-state signal supplied from said engine running-state sensor falls below a predetermined value;

wherein the protection circuit prevents the electric motor from being stopped during an off failure where the ignition switch off state signal is erroneously output from the ignition sensor and the engine is still running above a predetermined value, but the protection circuit protects the battery from power drain and stops possible operation of the electric motor when the ignition switch off state signal is output from the ignition sensor and the engine is stopped or running below the predetermined value.

2. An electric power steering apparatus according to claim 1, wherein said protection circuit includes an engine running-state comparator for comparing said engine running-state signal and said predetermined value and outputting a logical one signal when said engine running-state signal is above said predetermined value and logical zero signal when said engine running-state signal is below said predetermined value, and an OR logic operator for performing a logic sum of the result of comparison made by said engine running-state comparator and an output signal from said ignition sensor, said output signal from said ignition sensor being a logical one signal indicative of an ignition on state of said ignition switch or a logical zero signal indicative of the ignition off state of said ignition switch, wherein said switching unit for, on the basis a logical zero signal output from said OR logic operator, disabling said electric motor to be driven by said motor drive unit.

3. An electric power steering apparatus according to claim 2, wherein said switching unit includes a relay circuit having a normally-open contact relay.

4. An electric power steering apparatus according to claim 2, further including a constant voltage power supply connected with said battery to step down the power source of said battery to a constant voltage power source and supply the constant voltage power source to said control unit, wherein said switching unit is arranged to selectively interrupt supply of the power source from said battery to said motor drive unit.

5. An electric power steering apparatus according to claim 2, further including a constant voltage power supply connected with said battery to step down the power source of said battery to a constant voltage power source and supply the constant voltage power source to said control unit, wherein said switching unit is arranged to selectively interrupt supply of the motor control signal from said control unit to said motor drive unit.

6. An electric power steering apparatus for a vehicle, comprising:

a battery;

an electric motor for applying a steering assist force to a steering system of a vehicle;

a control unit for generating a motor control signal on the basis of at least a steering torque applied to the steering system;

a motor drive unit for driving said electric motor on the basis of said motor control signal;

an ignition sensor for detecting an operating condition of an ignition switch of the vehicle;

a vehicle velocity sensor for detecting a running-state of the vehicle and generating a vehicle velocity signal corresponding to the detected running-state of the vehicle; and a protection circuit for said battery including a switching unit arranged to interrupt operation of said electric motor when a signal indicative of an ignition off state of said ignition switch is supplied from said ignition sensor and the vehicle running-state signal supplied from vehicle velocity sensor falls below a predetermined value;

wherein the protection circuit prevents the electric motor from being stopped during an off failure where the ignition switch off state signal is erroneously output from the ignition sensor and the engine is still running above a predetermined value, but the protection circuit protects the battery from power drain and stops possible operation of the electric motor when the ignition switch off state signal is output from the ignition sensor and the vehicle velocity is stopped or running below the predetermined value.

7. An electric power steering apparatus according to claim 6, wherein said protection circuit includes a vehicle velocity comparator for comparing said vehicle running-state signal and said predetermined value and outputting a logical one signal when said vehicle running-state signal is above said predetermined value and a logical zero signal when said vehicle running-state signal is below said predetermined value, and an OR logic operator for performing a logic sum of the result of comparison made by said vehicle velocity comparator and an output signal from said ignition sensor, said output signal from said ignition sensor being a logical one signal indicative of an ignition on state of said ignition switch or a logical zero signal indicative of the ignition off state of said ignition switch, said switching unit for, on the basis of a logic zero signal output from said OR logic operator, disabling said electric motor to be driven by said motor drive unit.

8. An electric power steering apparatus for a vehicle, comprising:

a battery;

an electric motor for applying a steering assist force to a steering system of a vehicle;

a control unit for generating a motor control signal on the basis of at least a steering torque applied to the steering system;

a motor drive unit for driving said electric motor on the basis of said motor control signal;

an ignition sensor for detecting an operating condition of an ignition switch of the vehicle;

an engine running-state sensor for detecting a running state of an engine of the vehicle and generating an engine running-state signal corresponding to the detected running state of the engine;

a vehicle velocity sensor for detecting a running-state of the vehicle and generating a vehicle velocity signal corresponding to the detected running-state of the vehicle; and a protection circuit for said battery including a switching unit arranged to interrupt operation of said electric motor when a signal indicative of an ignition off state of said ignition switch is supplied from said ignition sensor, the engine running-state signal supplied from said engine running-state sensor falls below a first predetermined value, and the vehicle running-state signal supplied from said vehicle velocity sensor falls below a second predetermined value;

wherein the protection circuit prevents the electric motor from being stopped during an off failure where the ignition switch off state signal is erroneously output from the ignition sensor and the engine is still running above a predetermined value, but the protection circuit protects the battery from power drain and stops possible operation of the electric motor when the ignition switch off state signal is output from the ignition sensor and the engine is stopped or running below the predetermined value.

9. An electric power steering apparatus according to claim 8, wherein said protection circuit includes an engine running-state comparator for comparing said engine running-state signal and said first predetermined value and outputting a logical one signal when said engine running-state signal is above said predetermined value and a logical zero signal when said engine running-state signal is below said predetermined value, a vehicle velocity comparator for comparing said vehicle running-state signal and said second predetermined value and outputting a logical one signal when said vehicle running-state signal is above said predetermined value and a logical zero signal when said vehicle running-state signal is below said predetermined value, and an OR logic operator for performing a logic sum of the result of comparison made by said engine running-state comparator, the result of comparison made by said vehicle velocity comparator, and an output signal from said ignition sensor, said output signal from said ignition sensor being a logical one signal indicative of an ignition on state of said ignition switch or a logical zero signal indicative of the ignition off state of said ignition switch, said switching unit for, on the basis a logical zero signal output from said OR logic operator, disabling said electric motor to be driven by said motor drive unit.

* * * * *

UNITED STATES PATENT AND TRADEMARK OFFICE
CERTIFICATE OF CORRECTION

PATENT NO. : 6,223,852 B1
DATED : May 1, 2001
INVENTOR(S) : Mukai et al.

It is certified that error appears in the above-identified patent and that said Letters Patent is hereby corrected as shown below:

Column 3,
Line 52, "I$_N$" should read -- I$_M$ --

Column 4,
Line 3, "circuit 50" should read -- circuit 30 --

Column 5,
Line 49, "apparatus" should read -- apparatus 1 --

Column 7,
Line 54, "at least one" should read -- at least one --

Column 9,
Line 3, insert -- to -- after "thereby"
Line 5, "provide" should read -- provides --

Column 10,
Line 55, "lease" should read -- least --

Column 14,
Line 15, "engine" should read -- vehicle velocity --

Signed and Sealed this

Tenth Day of September, 2002

Attest:

JAMES E. ROGAN
Attesting Officer                Director of the United States Patent and Trademark Office